(No Model.)
J. KING & T. J. MAGNER.
VEHICLE SPRING.
No. 365,009. Patented June 14, 1887.
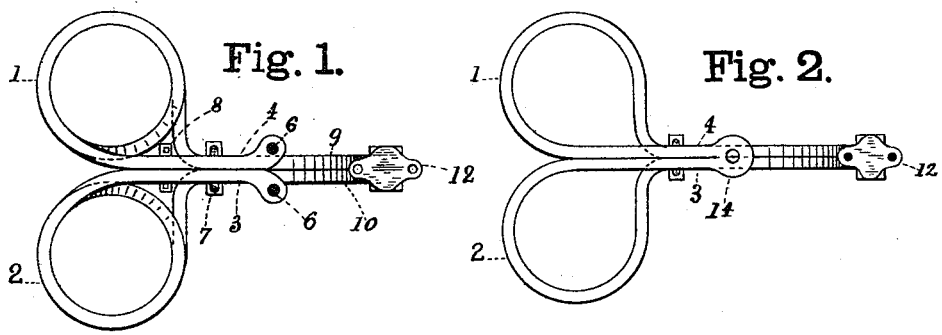
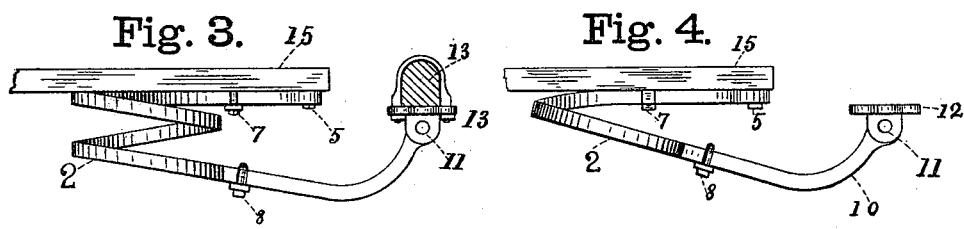
Witnesses.
Inventors.

UNITED STATES PATENT OFFICE.

JOB KING AND THOMAS J. MAGNER, OF BUFFALO, NEW YORK.

VEHICLE-SPRING.

SPECIFICATION forming part of Letters Patent No. 365,009, dated June 14, 1887.

Application filed July 12, 1886. Serial No. 207,761. (No model.)

*To all whom it may concern:*

Be it known that we, JOB KING and THOMAS J. MAGNER, citizens of the United States residing at Buffalo, in the county of Erie and State of New York, have invented certain new and useful Improvements in Vehicle-Springs, of which the following is a specification.

This invention relates to certain improvements in the vehicle-spring for which a patent was granted to Thomas J. Magner, (one of the parties hereto,) No. 335,942, dated February 9, 1886, and is adapted for use on carriages, light wagons, or other vehicles, and will be fully and clearly hereinafter described, shown, and claimed, by reference to the accompanying drawings, in which—

Figure 1 is a top view of the spring composed of two double coils. Fig. 2 is a top view of a similar spring composed of two single coils. Fig. 3 is a side elevation of Fig. 1, showing also a section through one of the side bars; and Fig. 4 represents a side elevation of Fig. 2.

The object of our invention is to bring the arms by which the spring is secured to the body of the vehicle and the arms by which it is attached to the side bars so that they will run parallel in the same direction, whereby it is rendered more firm and secure in place, and more durable when attached to a vehicle.

The spring is intended to be made either of two bars of steel, formed and clipped together, as shown in Figs. 1 and 3, or coiled and formed out of one single bar, and it is designed to make them either with two double coils, as shown in Figs. 1 and 3, or with two single coils, as shown in Figs. 2 and 4.

In said drawings, 1 and 2 represent the two double or single coils. The upper portions of the coils terminate in the arms 3 and 4, by which the springs are secured to the cross-bar of a vehicle by means of bolts 5, (shown in Fig. 3,) passing through the holes 6, (shown in Fig. 1,) and a clip, 7.

In Figs. 1 and 2 we have shown this spring as composed of two separate bars of steel clipped together by a clip, 7, for holding the upper arms, 3 and 4, together, and a clip, 8, to secure the lower arms, 9 and 10, together.

To the outer end of the lower arms, 9 and 10, is pivoted, by a pivot, 11, a shackle, 12, by which it is secured to the side bar 13. (Shown by a cross-section.) In Fig. 2 is shown the same spring, except the double coils 1 and 2 are each made of a single coil. The two coils here are formed of a single bar of steel, being bent at the point 14, where a hole is made to receive a bolt for securing it to the cross-bar. This spring is also secured in the same way to the vehicle and operates exactly the same, the only difference being that the coils 1 and 2 in one is a double coil and in the other a single coil.

It will be noticed that both the arms 1 and 2, for securing the springs to the cross-bar, (a portion of a cross-bar, 15, is shown in Figs. 3 and 4,) and the arms 9 and 10, by which they are secured to the side bars, both extend in a line parallel with each other in the same direction. This construction permits a strong and secure attachment of the spring to the vehicle, and a free action not obtained in any other way, as it brings the arms 3 and 4 in a better position to sustain the weight of the vehicle.

In Figs. 5 and 6 we have shown a modified construction of these springs, while the arms 9 and 10 lie parallel close together, the arms 3 and 4, instead of being bent so as to come close together, as in Figs. 1 and 2, pass straight forward from the outer sides of the coils, so that they are separated, as shown; but still they run in the same direction as the lower arms. In Fig. 5 the two coils 1 and 2 are made double, and in Fig. 6 just a single bend on each side is shown, terminating in the two arms 9 and 10.

We are aware that a spring, consisting of two vertical spiral coils, having their inner and outer arms parallel and extending in opposite directions, is shown in the patent to Thomas J. Magner, No. 335,942, and we therefore do not claim such, broadly; but What we do claim is—

1. A vehicle-spring composed of the vertical coils 1 and 2, each consisting of one or more coils extending from the arms 3 and 4, and having a short bend at the lower ends of the coils, so as to bring the arms 9 and 10 in a line parallel with each other and extend them in the same direction as the arms 3 and 4, as and for the purposes described.

2. A vehicle-spring consisting of two vertical spirals, 1 and 2, of one or more coils extending from the arms 3 and 4, each having a short bend at the lower ends of the coils, forming the arms 9 and 10, parallel with each other, and extending them in the same direction as the arms 3 and 4, the whole formed of a continuous single bar of steel, substantially as and for the purposes described.

JOB KING.
THOMAS J. MAGNER.

Witnesses:
JENNIE M. CALDWELL,
JAMES SANGSTER.